United States Patent
Li et al.

(10) Patent No.: US 7,963,514 B2
(45) Date of Patent: Jun. 21, 2011

(54) ROTATING MACHINE

(75) Inventors: Xue-jin Li, Tu-Cheng (TW); Wei Wang, Tu-Cheng (TW); Ai-jun Yan, Tu-Cheng (TW)

(73) Assignee: Cheng Uei Precision Industry Co., Ltd., Taipei Hsien (TW)

( * ) Notice: Subject to any disclaimer, the term of this patent is extended or adjusted under 35 U.S.C. 154(b) by 936 days.

(21) Appl. No.: 11/902,977

(22) Filed: Sep. 27, 2007

(65) Prior Publication Data

US 2009/0084203 A1 Apr. 2, 2009

(51) Int. Cl.
*B23Q 3/18* (2006.01)
(52) U.S. Cl. ............ 269/61; 269/48; 269/46; 269/56
(58) Field of Classification Search ............ 269/61, 269/48, 46, 56, 63, 290; 414/757, 783, 784; 74/606 R
See application file for complete search history.

(56) References Cited

U.S. PATENT DOCUMENTS

| | | | | | |
|---|---|---|---|---|---|
| 1,433,617 | A | * | 10/1922 | Hoffman | 81/487 |
| 1,473,949 | A | * | 11/1923 | Berg | 269/46 |
| 2,600,849 | A | * | 6/1952 | Collins et al. | 212/286 |
| 2,783,531 | A | * | 3/1957 | Eisler | 269/61 |
| 2,839,969 | A | * | 6/1958 | Anderson | 269/11 |
| 2,974,763 | A | * | 3/1961 | Vuncannon | 49/82.1 |
| 3,825,245 | A | * | 7/1974 | Osburn et al. | 269/30 |
| 4,054,772 | A | * | 10/1977 | Lichte | 219/121.14 |
| 4,068,467 | A | * | 1/1978 | Schreyer et al. | 59/93 |
| 4,568,070 | A | * | 2/1986 | Severt | 269/60 |
| 4,653,739 | A | * | 3/1987 | Moore | 269/61 |
| 4,896,086 | A | * | 1/1990 | Miyahara et al. | 318/568.1 |
| 5,104,612 | A | * | 4/1992 | Rousar | 376/248 |
| 5,115,549 | A | * | 5/1992 | Maruyama | 29/281.1 |
| 5,116,093 | A | * | 5/1992 | Burns | 294/19.1 |
| 5,403,146 | A | * | 4/1995 | Jones | 414/783 |
| 5,497,060 | A | * | 3/1996 | Juergens, III | 700/60 |
| 6,527,621 | B1 | * | 3/2003 | Halley | 451/5 |
| 7,624,613 | B2 | * | 12/2009 | Yu et al. | 72/402 |
| 2004/0047701 | A1 | * | 3/2004 | Chen | 409/221 |
| 2006/0012196 | A1 | * | 1/2006 | Wooten et al. | 294/82.1 |

FOREIGN PATENT DOCUMENTS

EP 592383 A1 * 4/1994

* cited by examiner

*Primary Examiner* — George Nguyen
(74) *Attorney, Agent, or Firm* — Rosenberg, Klein & Lee

(57) ABSTRACT

A rotating machine includes a receiving member having a base wall. A first cylinder module disposed above the receiving member includes a first cylinder body. Grappling hooks fixedly connecting with the first cylinder module are disposed below the first cylinder body. A second cylinder module mounted on a top surface of the base wall includes a second cylinder body. A rotating module includes a rotatable shaft rotationally settled in the base wall. A top end of the rotatable shaft engages with a salver below the grappling hooks. A gear wheel is located around the rotatable shaft and below the salver. A rack meshing with the gear wheel connects with the second cylinder body, and controlling switches are used for starting the first cylinder module and the second cylinder module.

13 Claims, 4 Drawing Sheets

ROTATING MACHINE

BACKGROUND OF THE INVENTION

1. Field of the Invention

The present invention relates to a rotating machine, and more particularly to a rotating machine used for testing a rotational property of a product.

2. The Related Art

Generally speaking, in industrial production, after a product is assembled and finished, we have to test the properties thereof. Different products have different properties to be tested. Such as, some products need to test rotational properties thereof, and some products need to test electric conductivities thereof, and so on.

Recently, an art product is provided on the market. The art product includes a deflating mechanism and a sucking tray. The deflating mechanism rotates to deflate air from the sucking tray for locating the art product on a wall or glass surface. So obviously after the art product is assembled, it is necessary to rotate the art product in order to test the rotational property thereof. Conventionally, the rotational property of the art product is performed by hand. However, when the art product is manufactured in massive production, the workload that a worker takes increases. The worker is easy to feel tired after a long time work, and thereby the worker rotates the art product not adequately in the process of testing the art product, so causing some unqualified art products to pass the test and appear on the market, which damage the benefit of consumers and further damage the reputation of a manufacturer.

SUMMARY OF THE INVENTION

Accordingly, an object of the present invention is to provide a rotating machine to test a rotational property of a product. The rotating machine includes a receiving member having a base wall. A first cylinder module disposed above the receiving member includes a first cylinder body. Grappling hooks fixedly connecting with the first cylinder module are disposed below the first cylinder body. A second cylinder module mounted on a top surface of the base wall includes a second cylinder body. A rotating module includes a rotatable shaft. The rotatable shaft is rotationally settled in the base wall. A top end of the rotatable shaft engages with a salver which is below the grappling hooks. A gear wheel is located around the rotatable shaft and below the salver. A rack connects with the second cylinder body that drives the rack moving. The rack meshes with the gear wheel for driving the gear wheel rotating. Accordingly, the salver and the rotatable shaft follow the gear wheel to rotate. And controlling switches are used for starting the first cylinder module and the second cylinder module.

As described above, the rotating machine is easy and safe to operate. Meanwhile, the rotating machine makes the product rotate fully, ensuing the quality of the product. Additionally, the rotating machine can test different kinds of products just through changing the corresponding salver of the rotating module and the grappling hooks, increasing the practicality of the rotating machine.

BRIEF DESCRIPTION OF THE DRAWINGS

The present invention will be apparent to those skilled in the art by reading the following description of a preferred embodiment thereof, with reference to the attached drawings, in which.

DETAILED DESCRIPTION OF THE PREFERRED EMBODIMENT

Figure 1:
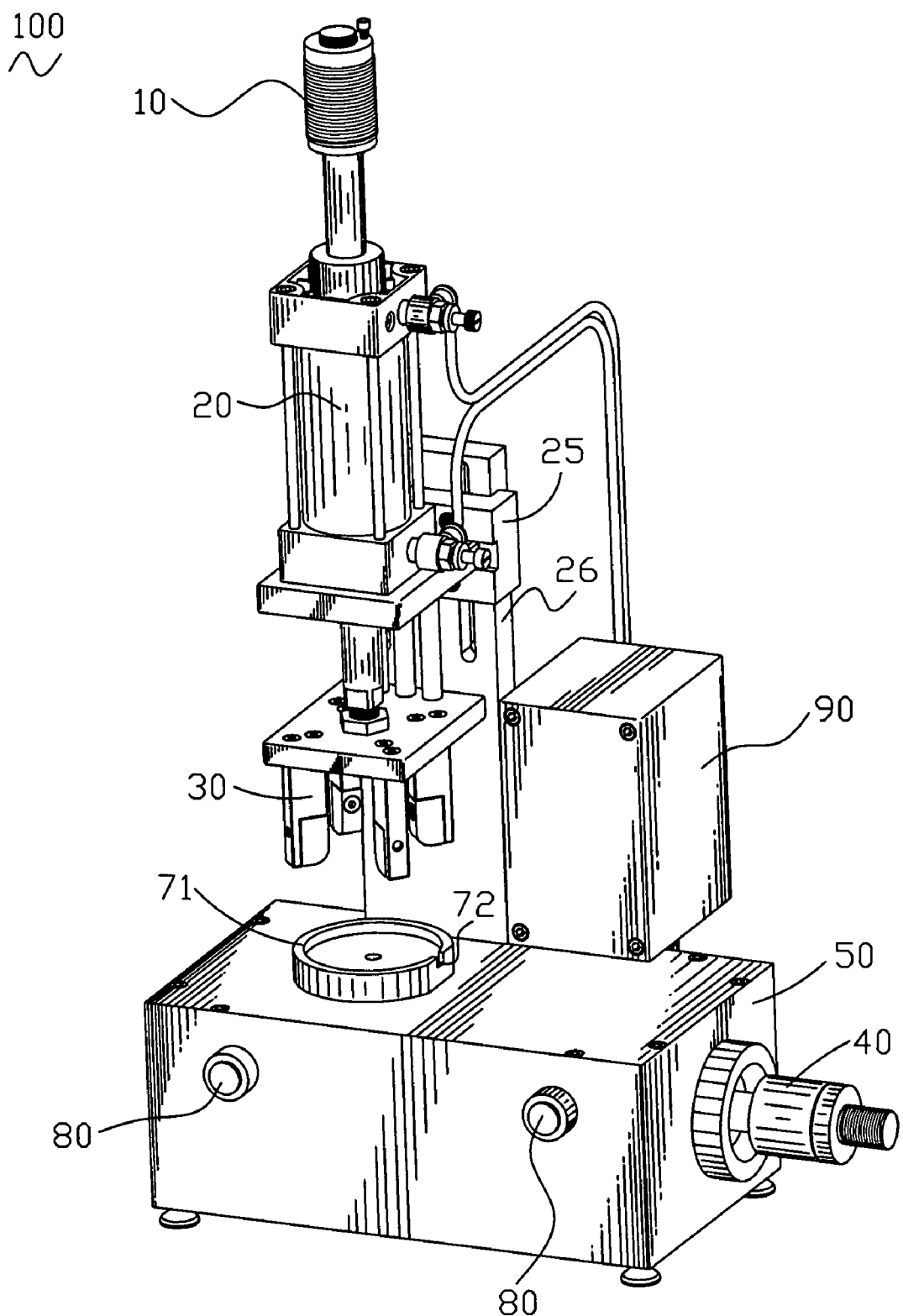
FIG. 1 is a perspective view of a rotating machine in accordance with the present invention.
Figure 3:
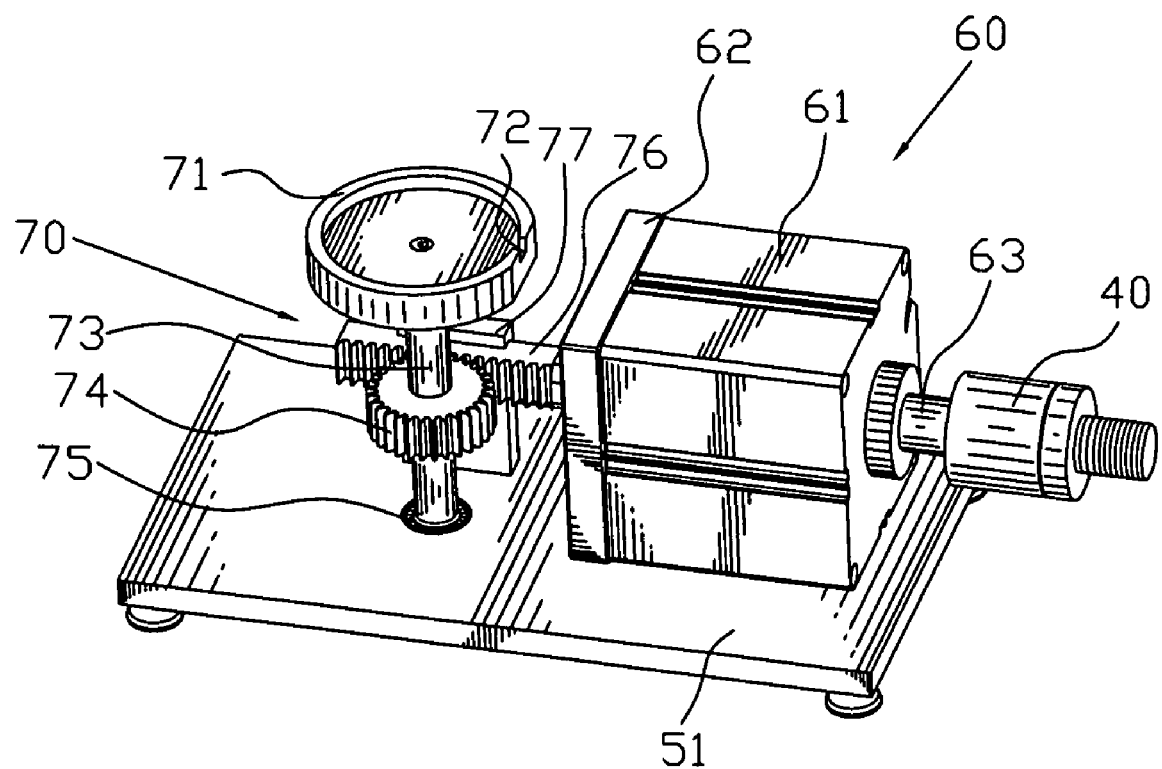
FIG. 3 shows a rotating module engaging with a second cylinder module.

Please refer to FIG. 1 and FIG. 3. A rotating machine 100 in accordance with the present invention includes a first cylinder module 20, four grappling hooks 30 connecting with the first cylinder module 20, a second cylinder module 60, a rotating module 70 engaging with the second cylinder module 60, a circuit box 90 for controlling the first cylinder module 20 and the second cylinder module 60, and a pair of controlling switches 80 to start the first cylinder module 20 and the second cylinder module 60. Both the second cylinder module 60 and the rotating module 70 are installed in a receiving case 50.

Figure 2:
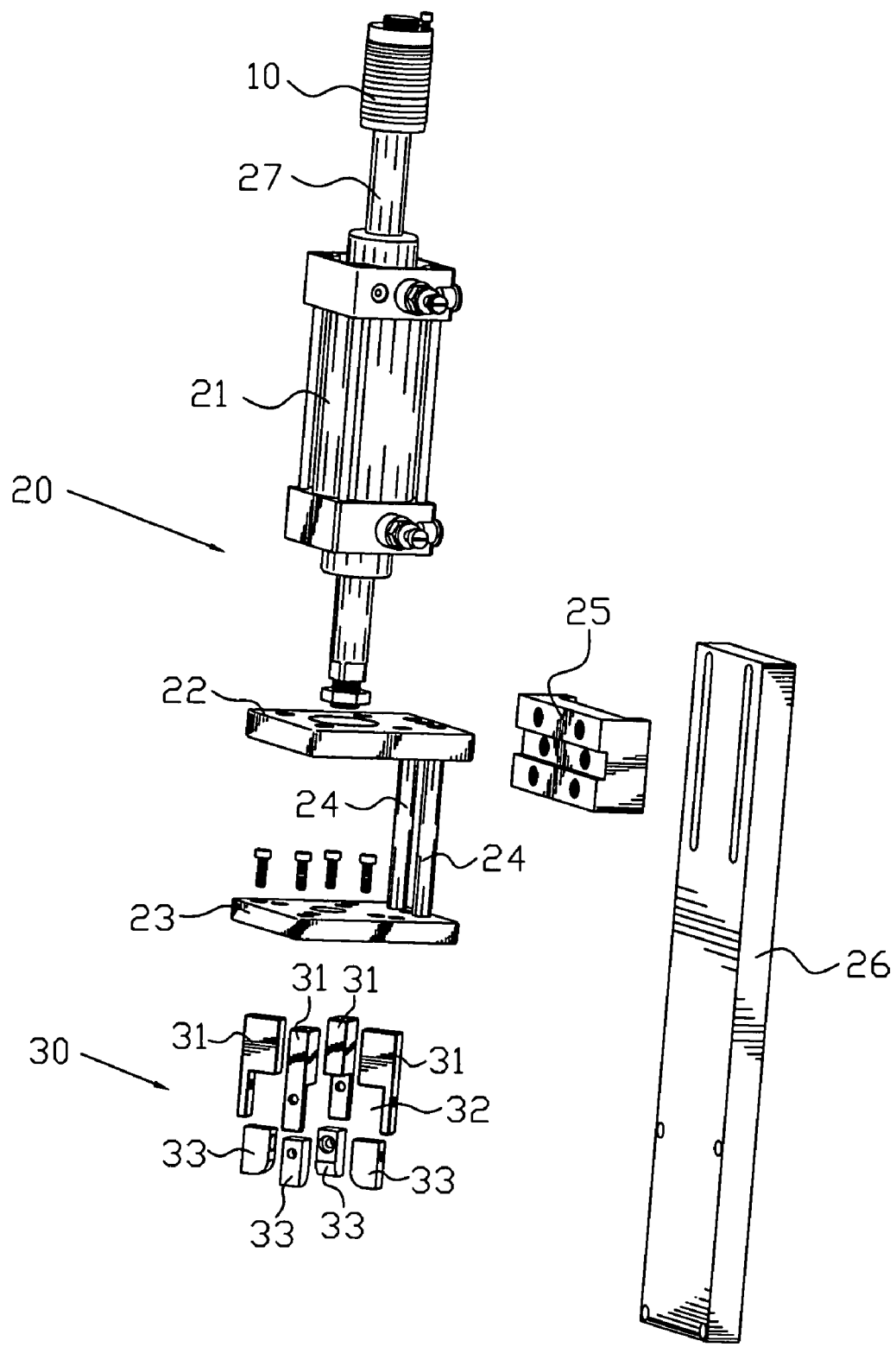
FIG. 2 is an exploded view of a first cylinder module and grappling hooks.

Referring to FIG. 2 in accordance with FIG. 1, the first cylinder module 20 includes a first cylinder body 21. A first connecting pillar 27 passes through the first cylinder body 21 vertically and an upper end of the first connecting pillar 27 connects with a first adjusting nut 10 used for adjusting the travel of the first connecting pillar 27. A lower end of the first connecting pillar 27 engages with two sustaining blocks designated an upper sustaining block 22 and a lower sustaining block 23 which hold the first cylinder body 21. The two sustaining blocks 22, 23 are parallel with each other and spaced apart through two guiding bars 24 arranged in a row. The upper sustaining block 22 is fixed on a loading block 25 which is assembled on a supporting board 26. The supporting board 26 is in long board shape and disposed vertically to be fabricated with the receiving case 50.

The lower sustaining block 23 fixedly connects with the four grappling hooks 30 which are distributed symmetrically. The grappling hook 30 includes a rectangular block-shaped locating member 31 disposed vertically and mounted on a bottom surface of the lower sustaining block 23. The locating member 31 defines a rectangular gap 32 at a bottom corner thereof. A mating member 33 which is of plastic material is fittingly located in the gap 32. The mating member 33 has a slick arc corner at bottom.

Figure 4:
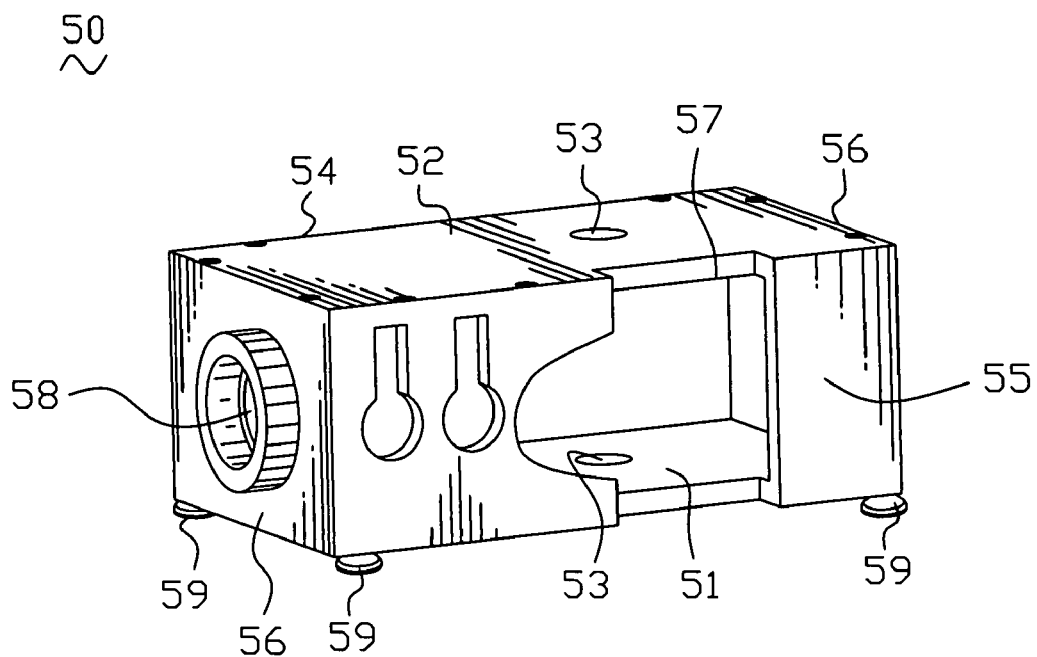
FIG. 4 is a perspective view of a receiving case which is cut partly.

Please refer to FIG. 4 showing a perspective view of the receiving case 50. The receiving case 50 is a substantially rectangular hollow case. The receiving case 50 has a base wall 51, a top wall 52, a front wall 54, a rear wall 55 and two sidewalls 56. Two accommodating holes 53 are defined on the base wall 51 and the top wall 52 respectively, and axle centers of the two accommodating holes 53 are on the same vertical line. The rear wall 55 is cut partly to form a mounting opening 57 where the supporting board 26 of the first cylinder module 20 is located. A through-hole 58 is defined and passes through one sidewall 56. Four pads 59 are mounted at four corners of a bottom surface of the base wall 51 for supporting the receiving case 50.

Please refer to FIG. 1, FIG. 3 and FIG. 4. The second cylinder module 60 assembled in the receiving case 50 includes a second cylinder body 61. The second cylinder body 61 is integrated with a fixing frame 62 at a side thereof. Both the second cylinder body 61 and the fixing frame 62 are seated on the base wall 51 of the receiving case 50. A second connecting pillar 63 is inserted in the through-hole 58 of the receiving case 50 and passes through the second cylinder body 61 and the fixing frame 62 horizontally. One end of the second connecting pillar 63 connects with a second adjusting nut 40 exposing out of the receiving case 50 for adjusting the travel thereof. The other end of the second connecting pillar 63 defines an aperture (not shown) therein.

The rotating module 70 received in the receiving case 50 includes a cylindrical rotatable shaft 73 disposed vertically. The rotatable shaft 73 runs through the top wall 52 and the base wall 51 and is received in the accommodating holes 53. A bottom end of the rotatable shaft 73 inserted in the accommodating hole 53 defined on the base wall 51 is surrounded with a bearing 75 to drive the rotatable shaft 73 rotating. A top end of the rotatable shaft 73 engages with a circular salver 71. The salver 71 is disposed on a top surface of the top wall 52 of the receiving case 50. The brim of the salver 71 defines a position opening 72. A gear wheel 74 is located around a substantial center of the rotatable shaft 73 and below the salver 71. A long strip rack 76 meshed with the gear wheel 74 has a connect portion (not shown) to be inserted in the aperture of the connecting pillar 63. The rack 76 is slidably received in a holding frame 77 and is supported via the holding frame 77 located on the base wall 51 of the receiving case 50.

The circuit box 90 is fabricated above the top wall 52 of the receiving case 50. The circuit box 90 connects with the first cylinder module 20 and the second cylinder module 60 respectively to control the operation time and motions of the first cylinder module 20 and the second cylinder module 60. The two controlling switches 80 are mounted on both sides of the front wall 54 of the receiving case 50 respectively to start the first cylinder module 20 and the second cylinder module 60.

Figure 5:
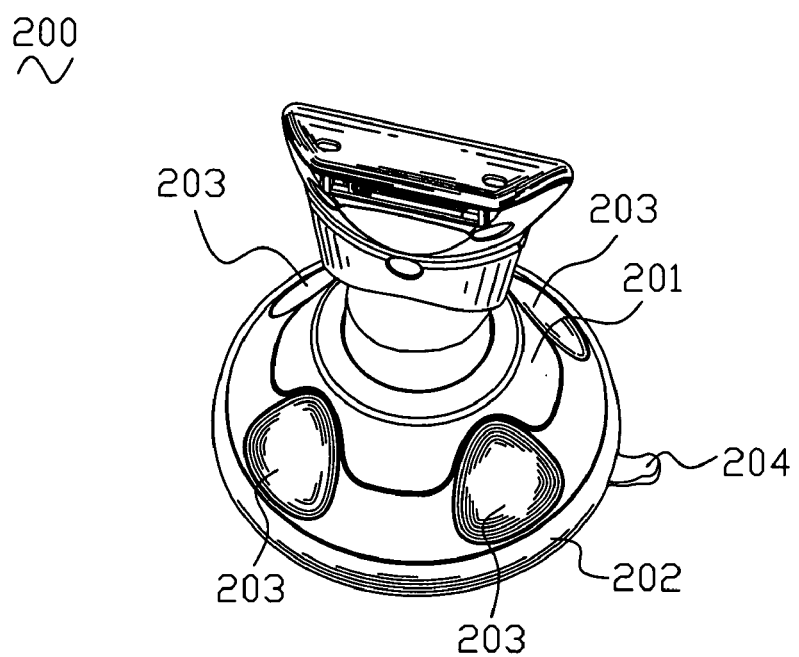
FIG. 5 is a perspective view of a product which needs to be tested.

Please refer to FIG. 5 showing a kind of product 200 that needs to be tested. The product 200 has a restraining portion 201. Four limiting cavities 203 are defined on the restraining portion 201 and distributed symmetrically. An active portion 202 which is in circular ring shape is disposed at the bottom of the restraining portion 201. A position portion 204 extends outward form the bottom of the restraining portion 201.

Please refer to FIG. 1 and FIG. 5. When the rotating machine 100 is used for testing the rotational property of the product 200, firstly put the product 200 on the salver 71 of the rotating module 70 and the position portion 204 of the product 200 is located in the position opening 72. Then, press the controlling switches 80 to start the first cylinder module 20 and the second cylinder module 60. The circuit box 90 controls the operation time and the motions of the first cylinder module 20 and the second cylinder module 60. The first cylinder module 20 moves downward and makes the four grappling hooks 30 insert in the four limiting cavities 203 of the product 200 correspondingly to locate the restraining portion 201 in the salver 71. Subsequently, the second cylinder module 60 begins to work and brings the long strip rack 76 to move. The long strip rack 76 drives the gear wheel 74 that meshes with the long strip rack 76 rotating in an appointed direction. Because the gear wheel 74 is located around the rotatable shaft 73, the rotatable shaft 73 and the salver 71 follow the gear wheel 74 to rotate in the same direction as the gear wheel 74. So, the active portion 202 of the product 200 is driven rotating relatively to the restraining portion 201. When the salver 71 rotates at a particular portion, the gear wheel 74 stops rotating and then rotates in an opposite direction. At this time, the first cylinder module 20 rises and makes the four grappling hooks 30 depart from the product 200. Afterwards, the product 200 is taken away from the salver 71 to finish being tested, and then, another product 200 is put on the salver 71 to be tested.

As described above, the rotating machine 100 is easy and safe to operate. Meanwhile, the rotating machine 100 makes the active portion 202 of the product 200 rotate fully, ensuing the quality of the product 200. Additionally, the rotating machine 100 can test different kinds of products just through changing the corresponding salver 71 of the rotating module 70 and the grappling hooks 30, increasing the practicality of the rotating machine 100.

The foregoing description of the present invention has been presented for purposes of illustration and description. It is not intended to be exhaustive or to limit the invention to the precise form disclosed, and obviously many modifications and variations are possible in light of the above teaching. Such modifications and variations that may be apparent to those skilled in the art are intended to be included within the scope of this invention as defined by the accompanying claims.

What is claimed is:

1. A rotating machine, comprising:
   a receiving member, having a base wall;
   a first cylinder module, disposed above the receiving member, including a first cylinder body;
   grappling hooks, fixedly connecting with the first cylinder module, disposed below the first cylinder body;
   a second cylinder module, mounted on a top surface of the base wall, including a second cylinder body;
   a rotating module, including a rotatable shaft, the rotatable shaft rotationally settled in the base wall, a top end of the rotatable shaft engaging with a salver below the grappling hooks, a gear wheel located around the rotatable shaft and below the salver, a rack connecting with the second cylinder body which drives the rack moving, the rack meshing with the gear wheel for driving the gear wheel rotating, accordingly, the salver and the rotatable shaft following the gear wheel to rotate; and
   controlling switches, for starting the first cylinder module and the second cylinder module.

2. The rotating machine as claimed in claim 1, further comprising a circuit box connecting with the first cylinder module and the second cylinder module respectively to control the operation time and motions of the first cylinder module and the second cylinder module.

3. The rotating machine as claimed in claim 1, wherein the first cylinder module includes a first connecting pillar passing through the first cylinder body vertically, a lower end of the first connecting pillar engages with two sustaining blocks that hold the first cylinder body, the two sustaining blocks are parallel with each other and spaced apart through two supporting bars, the sustaining block which is disposed above is fixed on a loading block configured on a supporting board, the sustaining block which is disposed below fixedly connects with the four grappling hooks, the supporting board is assembled at a side of the base wall.

4. The rotating machine as claimed in claim 3, wherein the first connecting pillar connects with a first adjusting nut at an upper end thereof.

5. The rotating machine as claimed in claim 1, wherein the grappling hook includes a locating member fixedly connecting with the first cylinder module, the locating member defines a gap at a bottom corner thereof, a mating member is located in the gap and has a slick arc corner at bottom.

6. The rotating machine as claimed in claim 5, wherein the mating member is of plastic material.

7. The rotating machine as claimed in claim 1, wherein the second cylinder body is integrated with a fixing frame at a side thereof, both the second cylinder body and the fixing frame are seated on the top surface of the base wall, a second connecting pillar passes through the second cylinder body and the fixing frame horizontally, one end of the second connecting pillar connects with the rack.

8. The rotating machine as claimed in claim 7, wherein the second connecting pillar connects with a second adjusting nut at the other end thereof.

9. The rotating machine as claimed in claim 1, wherein the rotatable shaft is surrounded with a bearing at a bottom end thereof.

10. The rotating machine as claimed in claim 1, wherein the salver defines a position opening at the brim thereof.

11. The rotating machine as claimed in claim 1, wherein the rack is slidably received in a holding frame and supported via the holding frame that is located on the top surface of the base wall of the receiving member.

12. The rotating machine as claimed in claim 3, wherein the receiving member is a receiving case, the second cylinder module and the rotating module are mounted in the receiving case, the receiving case has the base wall, a top wall, a front wall, a rear wall and two sidewalls, two accommodating holes are defined on the base wall and the top wall respectively to receive the rotatable shaft, and the salver is disposed on a top surface of the top wall, the rear wall is cut partly to form a mounting opening which engages with the supporting board of the first cylinder module, four pads are mounted at four corners of a bottom surface of the base wall and support the receiving case.

13. The rotating machine as claimed in claim 12, wherein the controlling switches are defined on the front wall of the receiving case.

\* \* \* \* \*